No. 858,493. PATENTED JULY 2, 1907.
W. S. WESTON.
BRAKE SHOE.
APPLICATION FILED NOV. 8, 1906.

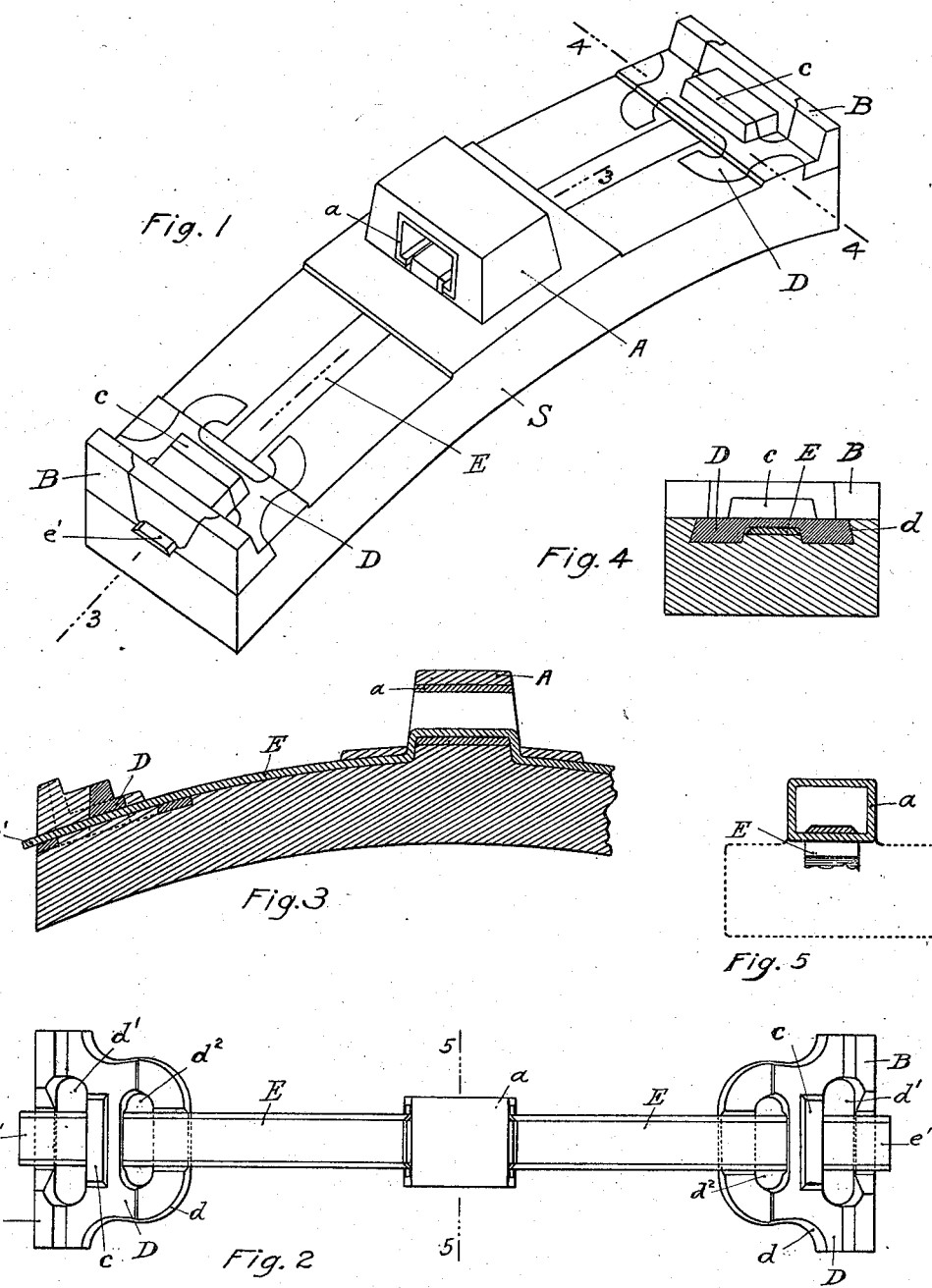

2 SHEETS—SHEET 2.

Witnesses: Inventor:

UNITED STATES PATENT OFFICE.

WILLIAM S. WESTON, OF CHICAGO, ILLINOIS.

BRAKE-SHOE.

No. 858,493.  Specification of Letters Patent.  Patented July 2, 1907.

Application filed November 8, 1906. Serial No. 342,457.

*To all whom it may concern:*

Be it known that I, WILLIAM S. WESTON, a citizen of the United States, and a resident of Chicago, in the county of Cook and State of Illinois, have invented certain new and useful Improvements in Brake-Shoes, of which the following is a full, clear, and exact description, reference being had to the accompanying drawings, forming part of this specification.

My invention relates to improvements in composite brake shoes, having preformed, metallic parts secured in place by being wholly or partially embedded in the cast metal poured into the molds to form the completed shoe.

It pertains more particularly to improvements in the type of shoe known as the reinforced back, and has for its object an increase in the safety and serviceability qualities of the shoe, and an increase in the facility of its manufacture.

My invention consists in novel features of construction described hereinafter, illustrated in the accompanying drawings, and more particularly pointed out in the claims at the end of this specification.

Figure 6:
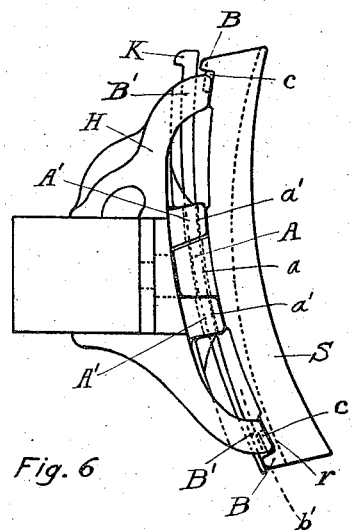
Figure 7:
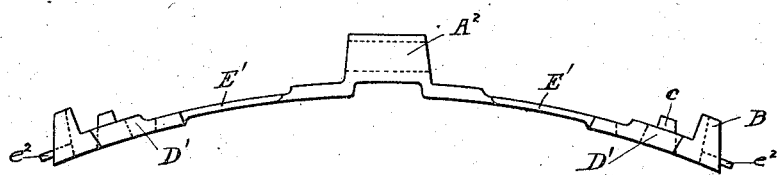
Figure 8:
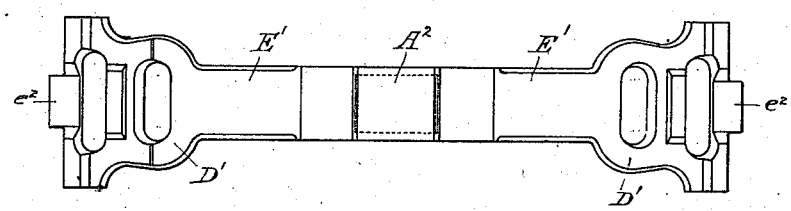

Figure 1 is a view in projection of a brake shoe embodying my invention. Fig. 2 is a back view of the several perforated parts which are to be cast into the back of the shoe. Fig. 3 is a longitudinal section on the line 3—3 of Fig. 1. Fig. 4 is a transverse cross-section on the line 4—4 of Fig. 1. Fig. 5 is a cross-section on the line 5—5 of Fig. 2. Fig. 6 is an end view of a brake beam with brake head and shoe. Figs. 7 and 8 illustrate an alternate construction of the parts shown in Fig. 2.

Similar letters refer to the same parts in the several views.

The shoe S illustrated in Figs. 1 and 6 in its full outline is the well-known Master Car Builders' standard type with retaining lugs A at the center of the back, stop lugs B B at the ends and the small guide lugs c c adjacent to the stop lugs. When set in place in the brake head H, (Fig. 6) the lug A of the shoe rests between two lugs A' A' on the brake head, and the shoe is secured by a key K which is passed through the eyelet a of the lug A and corresponding eyelets a' a' of the lugs A' A'. The brake head is provided with usual bifurcated brace portions B' B' adapted to bear against the back of the shoe just within the limits of the stop lugs B B and astride the guide lug c c. By this method of mounting, pressure from the brake operating mechanism is transmitted to the shoe at both ends as well as the center, and under normal conditions of a true brake head and uniform wear of friction surface, there should be no tendency of the shoe to brake transversely because of stress due to this transmitted pressure.

The full understanding of my invention may be best arrived at by first considering the gradual wearing out and final destruction of the shoe in service, and the importance of providing means to prevent premature destruction and consequent derangement and abnormal wear of the brake head and other shoes in the same system of brake rigging. It is important that both ends of the shoe as well as the center should last considerably beyond the limit of its allowed service in order that the other shoes in the same rigging may not fail of their braking function through the unusual slack in the system due to a missing shoe. It is also important that the brace portions B' B' of the brake head be protected from wear, as in the event of their being worn back to a line as at b' Fig. 6, the brace B' will not bear against the back of the shoe and is not in position to support the shoe in the last stages of its wear.

It is well known in practice that the ordinary cast iron brake shoe, without reinforcement of tougher metal in the back is liable to crack transversely under action of the heat and allow the end portions to fall away. As there is no criterion by which to determine when this cracking and breaking up will take place, consideration for safety and maintenance cause a large proportion of such shoes to be thrown in the scrap before they are more than half worn out. To overcome the element of danger from dropping pieces and to reduce the weight of scrap, there have been devised various designs for reinforcing the backs of brake shoes with tougher and more or less non-breakable metal. A design well known in the arts is the steel back, consisting of a thin plate of rolled steel, either plain or perforated, which is embedded in the back surface of the shoe. In the majority of these designs the function of the reinforcement is not so much to stiffen the back of the shoe as it is to hold the pieces of the shoe together after it has become cracked. A shoe so reinforced may be worn (under the most favorable condition that both ends wear alike) up to the limit of the reinforcement before it is replaced. But the continued use of the shoe after this limit has been reached will cause the reinforcing parts to be worn through or thrust out of place and the brake head damaged as described; and in anticipation of this result the shoe is often discarded while it still has considerable wearing life left. Unequal wearing of the ends of the shoe, as indicated by the dotted lines in Fig. 6 is another cause for the "scrapping" or discarding of half worn shoes. The primary object of my invention is to eliminate these defects in the economic maintenance of the braking mechanism by providing a shoe with a back which will not only not break up but which, in that portion exposed to the wearing action of the wheel, will have a very low rate of wear as compared with the main body of the shoe, *i. e.*, a shoe which when worn through to the back will still be within safe limits of serviceability in protecting the brake head and supporting the operation of the other shoes in the system.

Referring again to Figs. 1 and 2 the pieces D D are blocks of iron or steel or other metallic substance whose resistance to friction wear is very much greater than that of the material in the body of the shoe. These pieces are designed to be embedded in the back of the shoe at each end in a position to protect the brace portions B' B' of the brake head from the wearing action of the wheel. For this purpose they are preferably shaped so as to form a portion of the stop lugs B B and guide lugs c c. In order that these hard metal pieces may be securely embedded or dovetailed in the back of the shoe, preferably the edges are beveled as at $d$ and holes $d'$ and $d^2$ are provided through and into which the cast metal of the body flows to form the full outline of the shoe. To bind the pieces D D together, and insure their retention on the brake-head after the body of the shoe is worn away, I mount them upon a connector E which is previously passed through the eyelet $a$ of the lug A. The connector E may be of any suitable form, but as shown it consists of a single strap that is preferably formed with a beveled edge and it is of tough, wrought iron or steel and is embedded preferably flush with the surface of the back of the shoe, as shown in Figs. 1 and 3. The slow wearing pieces D D extend from opposite sides of the connector or plate E and those portions of the pieces D D upon the inner or lower side of the connector form shallow emergency wearing surfaces adapted to be brought into action when the body of the shoe S is worn down, while those portions of the pieces D D that project rearwardly or upwardly from the plate or connector E afford bearing lugs to receive the thrust of the ends of the brace portions of the brake-head. By reference to Figs. 3 and 4 of the drawings, it will be seen that the strap or connector E is not subject to wear from the wheel, until sometime after the wear on the hard metal pieces D D has begun. The eyelet $a$ is made of tough metal and this eyelet will be suitably anchored to the body of the shoe. The eyelet may be entirely surrounded by the cast metal that forms the body of the shoe, or the upper portion and side portions of the eyelet may be exposed, as shown in Fig. 5 of the drawing. When the eyelet is surrounded by a body of cast metal, it may be of comparatively light material, but when the eyelet $a$ is not reinforced by the cast metal, it is preferably made with thicker walls. The plate or connector E is suitably anchored to the eyelet $a$ preferably by threading the plate or connector through the eyelet, as clearly shown in the drawings.

In the preferred form of my invention, which is that illustrated upon Sheet 1 of the drawings, the inserts or wearing pieces D D are formed separate from the strap or connector E that unites these pieces to the eyelet $a$. This construction not only enables the wearing pieces to be formed of a much harder metal than the tough metal of the connector, but also allows these pieces to be formed as separate castings which materially lessens their cost of manufacture. The holes formed in the pieces D D enable these pieces to be threaded upon the ends of the strap or connector E, and when thus threaded upon the strap or connector E the frictional engagement of the pieces with the strap or connector will hold them in proper position while the cast metal that is to form the body of the brake shoe is being poured into the mold. The projecting ends $e'$ of the strap or connector E will rest upon the edges of the mold and serve to support the strap or connector E and the inserts or wearing pieces D D; but after the casting operation, these projecting ends $e'$ may be broken or cut off, if desired.

In the form of the invention illustrated in Figs. 7 and 8 of the drawing, the wearing pieces or inserts D' are shown as formed integral with the strap or connector E' and the eyelet $A^2$ is also shown as formed in piece with the connector E'. When thus constructed, the several integral parts are preferably formed as a single casting of tough and non-breakable metal such as manganese steel, which has also the further advantage of being hard and slow wearing. But in this form of the invention, as in that previously described, it will be seen that the inserts or wearing pieces D' D' project a slight distance inwardly or downwardly from the body of the connector and afford emergency wearing surfaces, while those portions of the wearing pieces or inserts D' D' that project from the opposite side of the connector serve to receive the thrusts from the brace portions of the brake-head.

The lapse of time between the moment when wear begins on the inner faces of the pieces D' D' and the moment when it begins on the connector E' may be considered a margin of safety for the renewal of the shoe. During this time a portion of the braking effect of the shoe is maintained by the body metal extending between the wearing pieces D' D' and held in position by its union with these pieces and with the connector.

It is manifest that the precise details of construction above set out may be varied without departing from the spirit of the invention, and that features of the invention may be employed without its adoption as an entirety.

Having thus described my invention, what I claim as new, and desire to secure by Letters Patent, is:—

1. A brake shoe comprising a body portion of cast metal provided at its back with a connector of tougher metal, from the ends of which shallow inserts of relatively slow wearing metal project toward the face of the shoe.

2. A brake shoe comprising a body portion of cast metal provided at its back with shallow inserts of relatively slow wearing metal, said inserts being embedded in the body at the ends of the shoe and extending a slight distance toward the face of the shoe and a connector of tough metal between said inserts.

3. A brake shoe comprising a body portion of cast metal provided at its back with an eye of tough metal and provided at its ends with inserts of slow wearing metal and a connector of tough metal uniting said inserts to said eye, said inserts extending in opposite directions from said connector, the portions of said inserts at one side of said connector serving as hard wearing emergency surfaces and the portions of inserts extending in the opposite direction from said connector serving as the end lugs of the shoe.

4. A brake shoe comprising a body portion of cast metal provided at its back with a rod or plate of tough metal from the ends of which shallow inserts of slow wearing metal project in opposite directions towards the face and back of the shoe.

5. A brake shoe comprising a body portion of cast metal provided at its back with a rod or plate of tough metal having at its ends shallow inserts of slow wearing metal, said inserts being thicker than the tough metal plate and projecting from said plate a slight distance towards the face of the shoe.

6. A brake shoe comprising a body portion of cast metal provided at its back with a connector of tough metal having at its ends perforated inserts of slow wearing metal thicker than the body of said plate or back.

7. A brake shoe comprising a body portion formed of cast metal provided at its back with a connector of tough metal having at its ends perforated inserts, said inserts being formed at their backs with lugs and at their opposite sides with portions projecting towards the face of the shoe.

8. A brake shoe comprising a body portion of cast metal provided at its back with a connector of tough metal having at its ends inserts provided at their backs with lugs arranged at different distances from the ends of the inserts and adapted to receive the thrust of the brake head.

9. A brake shoe comprising a body portion of cast metal provided at its back with a connector of tough metal, inserts that are united together by said connector, said inserts being formed with portions projecting both inwardly and outwardly from said connector.

10. A brake shoe comprising a body portion of cast metal provided at its back with perforated inserts at the ends of the shoe and with a connector interlocked with said inserts and embedded in the metal at the back of the shoe.

11. A brake shoe comprising a body portion of cast metal provided at its back with perforated inserts at the ends of the shoe and with a connector interlocked with said inserts, said inserts being provided with openings through which said connector passes.

12. A brake shoe comprising a body portion of cast metal provided at its back with a connector formed of a plate of tough metal and inserts of slow wearing metal interlocked with the ends of said connector and of materially greater width than the body of said connector.

13. A brake shoe comprising a body portion of cast metal provided at its back with an eye of tough metal, a connector of tough metal passing through said eye and embedded in the back of the shoe, and inserts of slow wearing metal at the ends of said connector.

14. A brake shoe comprising a body portion of cast metal provided at its back with an eye of tough metal, a connector interlocked with said eye and provided at its ends with inserts of slow wearing metal projecting in opposite directions from the body of said connector, the inner portions of said inserts serving as emergency wearing surfaces and the outer portions of said inserts serving as lugs to receive the thrust of the brake head.

WILLIAM S. WESTON.

Witnesses:
HARRY L. CLAPP,
KATHARINE GERLACH.